F. FRANK.
PROCESS FOR EXTRACTING FATTY SUBSTANCES FROM FRESH (UNBROKEN) OIL FRUITS,
MOIST RAW WOOL, AND THE LIKE.
APPLICATION FILED MAR. 28, 1904.
915,169.  Patented Mar. 16, 1909.
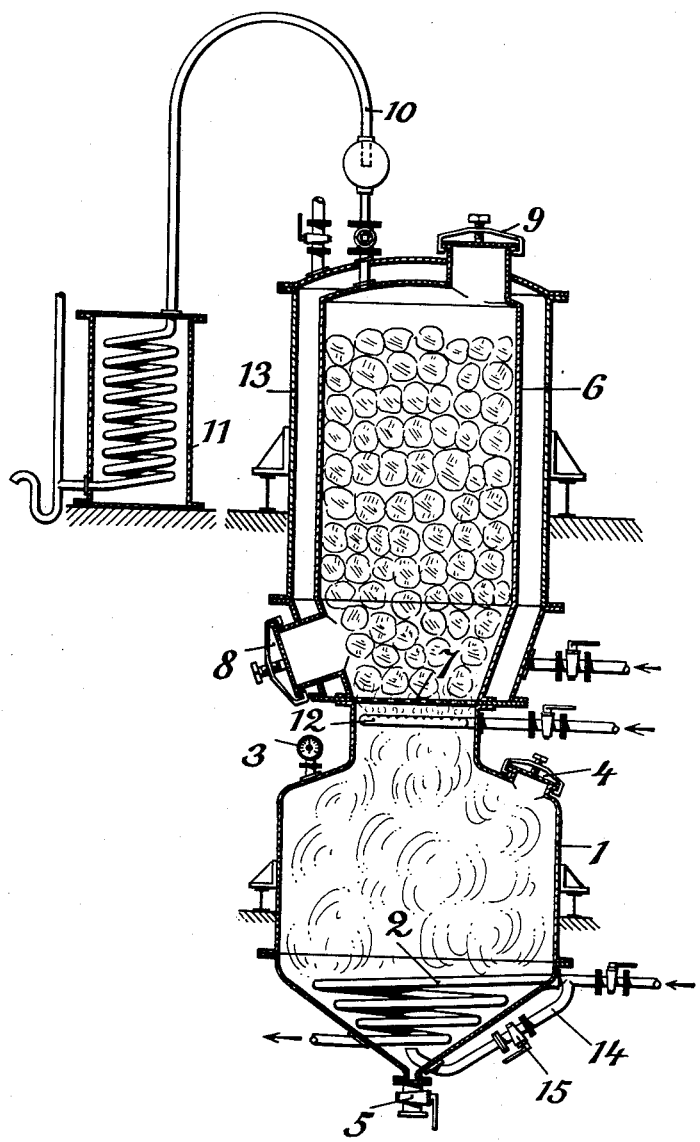
WITNESSES
w. Darvell.
M. F. Anderson
INVENTOR
Dr. Fritz Frank
by Georgii Massie
ATTORNEYS

UNITED STATES PATENT OFFICE.

FRITZ FRANK, OF BERLIN, GERMANY.

PROCESS FOR EXTRACTING FATTY SUBSTANCES FROM FRESH (UNBROKEN) OIL-FRUITS, MOIST RAW WOOL, AND THE LIKE.

No. 915,169. Specification of Letters Patent. Patented March 16, 1909.

Application filed March 28, 1904. Serial No. 200,462.

*To all whom it may concern:*

Be it known that I, FRITZ FRANK, chemist, a subject of the German Emperor, residing at 2 An der Jerusalemer Kirche, Berlin, Germany, have invented certain new and useful Improvements in Processes for Extracting Fatty Substances from Fresh (Unbroken) Oil-Fruits, Moist Raw Wool, and the Like; and I do hereby declare the following to be a full, clear, and exact description of the invention, such as will enable others skilled in the art to which it appertains to make and use the same.

My invention relates to a process for extracting fat from moist materials, such as oil-fruits, moist wool and the like.

I am aware that it has already been attempted to extract fat from materials containing a small quantity of water such as for instance from bones. The originators of these known processes however were of the opinion that the boiling point of the solvent must necessarily be above that of water. Commercial solvents, containing portions boiling under 100° centigrade are therefore subjected to fractional distillation. Employing so high boiling solvents, however, involves a double disadvantage, because in the first place a large number of solvents are excluded, which otherwise would be eminently fitted for extracting purposes, and secondly because some valuable fats would be deteriorated by heating them to so high temperatures.

By my improved process I find it possible to extract fat by means of solvents boiling at temperatures under 100° centigrade from substances containing considerable quantities of water, for instance fruits having an exterior pulp containing fatty oils, such as the fruits of *Elæis guineensis*, *Elæis melanococca*, *Astrocarium vulgare*, *Astrocarium acaule* and *Olea europæa*, the raw material not being previously reduced to small pieces.

In the present process, the moist material is treated by a stream of dry vapor from a fat solvent of low boiling point; lower than that of water. This dry vapor volatilizes the moisture in the material without boiling it and sealing the pores by steam, and carries the water vapor forward and away while the solvent vapor replaces it in the pores, coming into contact with exposed fatty matters. The vapors being at the boiling point of the solvent do not themselves condense to any great extent but they are absorbed by the fatty matter, diluting it, and rendering it more fluid and of greater volume, so that it drips or percolates out of the material and can be collected. From the collected mixture of fat and solvent, the latter can of course afterward be expelled by heat. The water as it volatilizes is carried away by the forward moving stream of solvent vapor, and the mixture is subsequently condensed and separated elsewhere, the regained solvent being dried and made suitable for further use. Volatilization of water being effected below its boiling point, the solvent vapors employed for this purpose, in accordance with the ordinary laws governing volatilization should be dry, *i. e.*, free from water vapor.

In the accompanying drawing an apparatus is illustrated which I prefer to employ in executing my herein described process.

The figure shows a vertical section through the apparatus such parts being omitted which are not essential for the explanation of the process.

In the drawing, 1 is a still with the heating worm 2, the manometer 3, the man-hole 4, and the discharging valve 5.

6 is a cylindric extraction vessel, which is separated from the still 1 by the sieve 7, which carries the raw material. Vessel 6 is accessible by the man-holes 8 and 9, and is provided with the pipe 10, which leads to the condenser 11.

12 is a coil provided with a large number of small openings for introducing steam, and 13 is a jacket surrounding the extraction vessel 6 for heating it by ordinary steam. When not containing steam the jacket and contained air serve as a heat insulating means for maintaining temperatures within the extraction vessel. A branch pipe 14 provided with the cock 15 is introduced at the lowest point of vessel 1.

My process is carried on as follows: The raw material is stacked in a high layer on the sieve 7. A sufficient quantity of solvent such as for instance a hydro carbon boiling at a temperature of about 90° centigrade is then introduced into the still 1 by means of the inlet 4. The latter is then tightly closed and steam is introduced into the worm 2. The hydrocarbon is thus evaporated and the vapors ascend and are condensed to some extent in the pores of the material treated in and on the contained fatty matters. The solution thus formed falls back into the still in the shape of drops. The water contained in the material is evaporated by the hydrocarbon vapor and a mixture of evaporated solvent and water vapor is carried upward and discharged through pipe 10 into the condenser 11, where the vapors are condensed and the resulting fluids can be separated in the usual way. Solvent vapors are passed through the material at such a rate that enough will pass uncondensed to carry forward the water vapor while only enough will condense to remove the fat, the amount thus passing forward being commonly greater than condensed. The jacket prevents loss of heat and consequent undue condensation of solvent in the material, aiding in maintaining such material at about the boiling temperature of the solvent. When all the fat has been extracted and has collected in the still it will be necessary to expel the solvent still contained in a liquid or vaporous state in the material or the vessel 6. For this purpose I provide the coil 12 by which I introduce ordinary steam. Thus the solvent contained in and about the material is driven off to the condenser. In order to assist this process steam may also be introduced into the jacket 13 by which means any loss of heat is effectually counteracted. In order to regain the solvent contained in the bottom of the still I now open the cock 15 thus introducing steam into the solution and thereby evaporating and driving off what of the solvent may be left. The fat can then be drawn off through the valve 5 and the apparatus can be emptied and prepared for receiving a fresh charge.

Vapors of all fat solvents being heavier than either air or water vapor, upon boiling the solvent in the fat well (1) the vapors slowly rise, displacing and driving before them the air in the apparatus. As they reach and surround the moist material to be extracted, moisture evaporates from it into said vapors and the moist vapors, being specifically lighter, also flow upward and forward above the heavy vapor of the solvent, and to and through the outside condenser shown. The difference in specific gravity precludes the possibility of the water vapors going downward and reaching the fat.

In this method, it will be noted, water and fatty matters are both extracted from the moist material undergoing treatment and separately removed. In prior methods it has been deemed necessary either to perform extraction at temperatures above the boiling point of water or to dry the material before exposing it to the solvent. High temperatures are usually injurious to the quality of the fatty matters to be extracted while in drying, oxidation is almost inevitable. In the present method, the temperature is kept within a safe limit, oxidation is precluded and yet thorough extraction is practicable, the water being removed from the sphere of action by the simple expedient of furnishing enough solvent to carry it forward and away.

Having thus fully described my invention, what I claim as new is:—

1. The process of extracting fatty matters from very moist oleaginous material which consists in protecting such material against external cooling and passing through such protected material a continuous current of dry vapor of a fat solvent of low boiling point at a temperature below the boiling point of water, said current passing said material at a rate materially faster than the solvent can condense therein and at a rate sufficiently fast to volatilize and carry forward substantially all the moisture in said material, and separately removing the volatilized water with the excess of solvent vapor and the fat with the condensed solvent.

2. The process of extracting fatty matters from very moist oleaginous materials which consists in protecting such material against external cooling and passing upward through such protected material a continuous current of dry vapor of a fat solvent of low boiling point, said current passing said material at a rate materially faster than the solvent can condense therein and at a rate sufficiently fast to volatilize and carry forward substantially all the moisture in said material, removing above such material the excess of solvent vapor and the volatilized water carried forward thereby, and removing below such material fat diluted with condensed solvent.

3. The process of extracting fatty matters from very moist oleaginous materials which consists in maintaining such material at the boiling point of a low-boiling fat solvent while below the boiling point of water, shielding such material against external cooling and continuously passing upward through said material a stream of vapor of such solvent at a rate materially faster than it will condense therein and at a rate sufficiently fast to volatilize and carry forward substantially all the moisture in said material, removing above the materials the excess of solvent vapor and the volatilized water carried forward thereby, and removing below the materials fat diluted with condensed solvent.

4. The process of extracting fatty matters from moist oleaginous materials which consists in subjecting said materials in a vertical column protected against loss of heat to an ascending column of dry solvent vapor at a temperature below the boiling point of water, said vapor column traveling at a rate materially faster than the vapor will condense in the material, removing vaporized water by leading off the same admixed with the excess of solvent vapor from the top of the column and allowing fat and condensed solvent to drop from the base of the column of materials until water and fat are removed from the said materials, and in then driving out solvent vapors in and around the material by a current of steam.

In testimony whereof I have affixed my signature to this specification, in the presence of two witnesses.

FRITZ FRANK.

Witnesses:
HENRY HASPER,
WOLDEMAR HAUPT.